United States Patent [19]

Moorman et al.

[11] 4,150,784

[45] Apr. 24, 1979

[54] CARD READER WITH SELECTIVELY MOVABLE BAFFLE TO CONTROLLABLY RESTRICT CARD INSERTION

[75] Inventors: Charles J. Moorman; Jerome L. Kistner, both of Cincinnati, Ohio

[73] Assignee: The Mosler Safe Company, Milford, Ohio

[21] Appl. No.: 905,403

[22] Filed: May 15, 1978

[51] Int. Cl.$^2$ ............................................. G06K 13/08
[52] U.S. Cl. ..................................... 235/479; 235/480
[58] Field of Search ............... 235/475, 479, 480, 477; 360/2

[56] References Cited

U.S. PATENT DOCUMENTS

| | | | |
|---|---|---|---|
| 3,516,527 | 6/1970 | Radford et al. | 194/4 |
| 3,766,687 | 10/1973 | Henson | 235/480 |
| 3,909,595 | 9/1975 | Morello et al. | 235/480 |

Primary Examiner—Daryl W. Cook
Attorney, Agent, or Firm—Wood, Herron & Evans

[57] ABSTRACT

A card reader includes a housing enclosing the operating components thereof which is provided with a card insertion slot. A baffle is movable between blocking and unblocking positions to block and unblock the card insertion slot, as desired. Located interiorly of the housing is a card carriage which reciprocates between a first limit position proximate the card insertion slot and a second limit position remote therefrom for transporting an inserted card along a path past a transducer located inside the housing proximate the second limit of travel for reading information from the card. A cam is provided on the carriage which cooperates with a cam follower associated with the baffle for camming the baffle from its card insertion slot blocking position to its card insertion slot unblocking position and vice versa, as the carriage moves toward and away from, respectively, its first limit position proximate the card insertion slot.

3 Claims, 4 Drawing Figures

CARD READER WITH SELECTIVELY MOVABLE BAFFLE TO CONTROLLABLY RESTRICT CARD INSERTION

This invention relates to card reading devices and, more particularly, to such devices having means for selectively blocking a card insertion slot associated with the device to prevent insertion of undesired cards and/or foreign objects.

Card readers having insertion slots through which information-bearing cards are inserted to facilitate reading thereof by a suitable transducer have been known for years.

It has also been known for years to provide card readers with a gate, or baffle, which is selectively movable to restrict the card insertion opening to prevent the insertion of undesired cards and/or foreign objects. Heretofore, the baffle has typically been operated by an electromechanical transducer of some kind for example, a solenoid. A solenoid dedicated to opening and closing a baffle, or gate, adds expense to the reader.

Accordingly, it has been an objective of this invention to eliminate, in a card reader of the movable carriage type, electromechanical means for operating the baffle. This has been accomplished in accordance with the principles of this invention by providing the carriage and baffle with a cam and cam follower, respectively, which cooperate as the carriage is driven toward the card insertion slot to cam the baffle to an unblocking position to facilitate transfer of a card from the card insertion slot to the carriage or vice versa. Thus, movement of the card transport carrier itself effectively directly controls the position of the baffle, eliminating the need for an electromechanical baffle actuator.

These and other features, advantages and objectives of the invention will become more readily apparent from a detailed description thereof taken in conjunction with the drawings in which.

Figure 1:
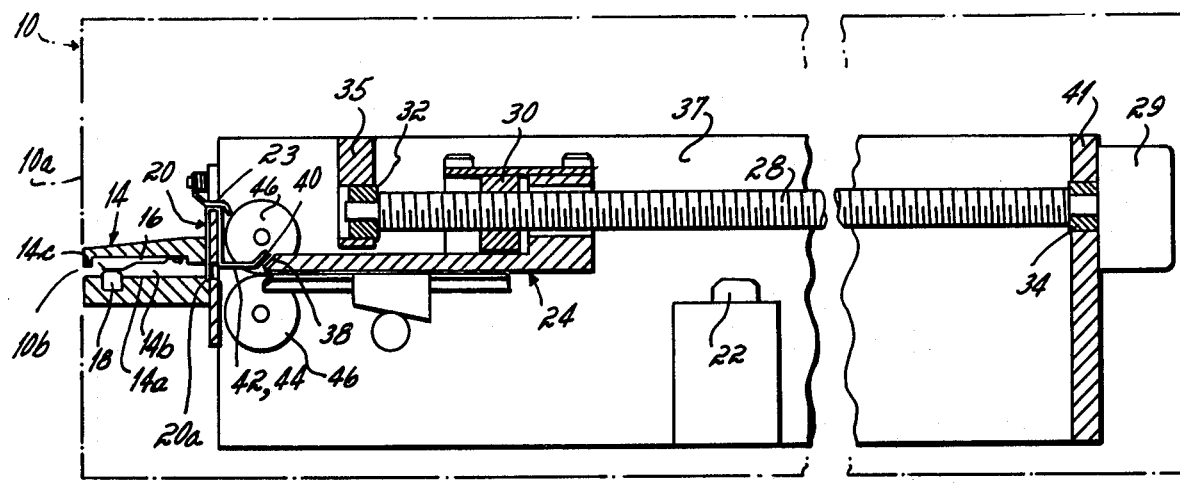
FIG. 1 is a side elevational view, partially in cross section, of the reader of this invention showing the carriage displaced from its first limit position proximate the card insertion slot and the baffle in its card insertion slot blocking position.
Figures 2, 3:
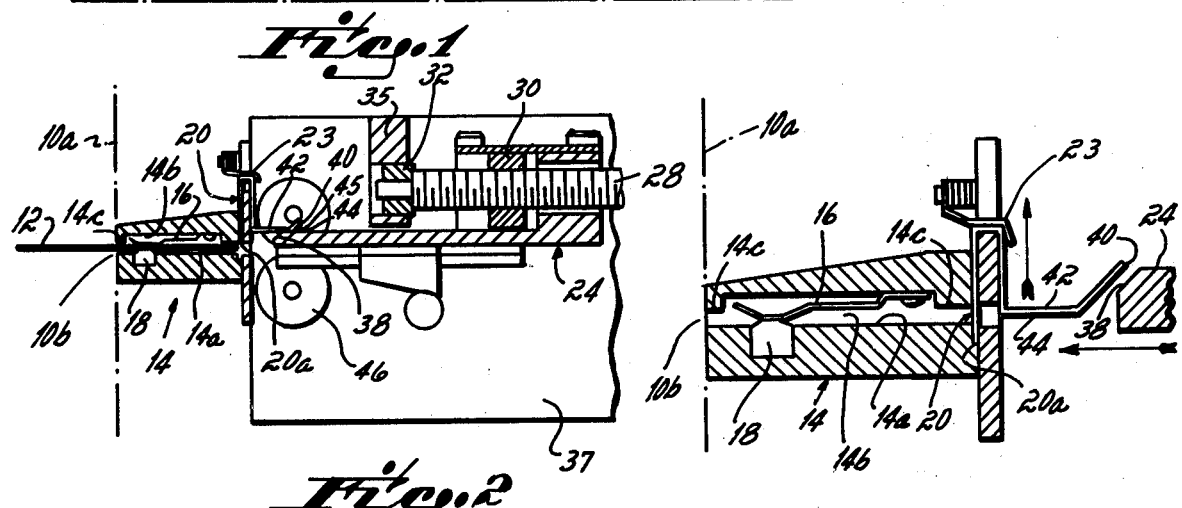
FIG. 2 is a side elevtional view, in cross section, of a portion of the reader showing the carriage at its first limit of travel position and the baffle in its slot unblocking position.
FIG. 3 is a side elevational view, in cross section, of a portion of the reader showing the relationship of the card slot, baffle and baffle actuating element mounted on the card carriage.
Figure 4:
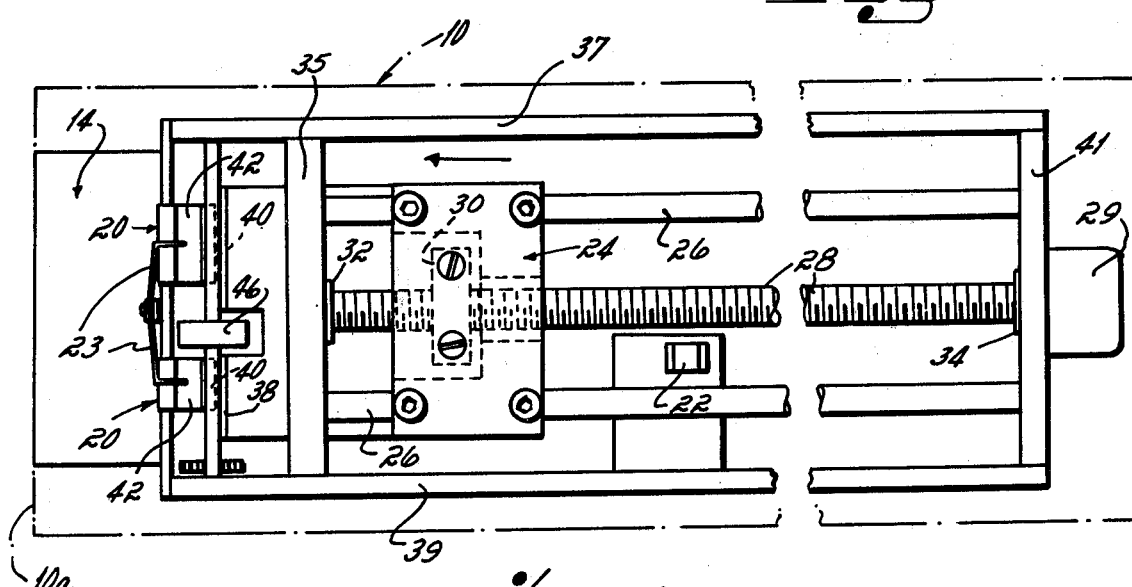
FIG. 4 is a plan view of the reader.

With reference to FIGS. 1-4, the reader of this invention is seen to include a housing 10 which encloses the operating components of the reader. The housing 10 may also enclose other devices, such as, a bill dispenser, depository or the like as is typical when the card reader is incorporated in automated teller equipment now popular in the banking field. The front wall 10a of the housing is provided with a card insertion slot 10b through which information bearing cards 12 are inserted prior to reading thereof, as shown in FIG. 2. Slot 10b also facilitates, subsequent to a card reading operation, return of the card to the user. The purpose of the housing 10 is basically to protect the operating components of the reader from malicious destruction and tampering, as well as foreign matter, the weather, etc.

Located interiorly of the card slot 10b is a card guide 14 having a length measured in the direction of card insertion of approximately 50% of the length of the card. The card guide 14 is provided with guide slot 14b generally defined by a lower flat guide surface 14a and an upper surface 14c which is spaced from the lower surface. An inserted card slides on the lower guide surface 14a as a consequence of being biased downwardly by a leaf spring 16 located in a notch formed in the upper surface 14c of the card guide 14. The card guide slot 14b at its left hand end communicates with the card insertion slot 10b formed in the front wall 10a of the housing 10. A sensor 18 mounted in the card guide 14 in sensing relationship with a card inserted in the card guide slot 14b is provided for reasons to become apparent hereafter.

A baffle or gate 20 having a generally planar configuration is mounted rightwardly of the card guide 14 in a generally vertical disposition. The baffle 20 has a horizontal lower edge 20a formed thereon. The baffle 20 is mounted for vertical movement between a lower, blocking position (FIGS. 1 and 3) and an upper, unblocking position shown in FIG. 2. In the unblocked position, the lower edge 20a of the baffle 20 is disposed above the card guide slot 14b, facilitating movement of a partially inserted card 12 into the interior of the reader. In the blocking position shown in FIGS. 1 and 3, the lower edge 20a of the baffle is disposed below the card guide slot 14b, effectively blocking the right hand end of the card guide slot to thereby prevent full insertion of a card (or foreign object) into the reader.

A spring 23 normally biases the baffle 20 to its blocking position.

Stationarily mounted within the housing 10 is an information transducer 22. A card carriage 24 is mounted for sliding movement on suitable carriage guides 26 between a first limit of travel shown in FIG. 2 proximate the baffle 20, and a second limit of travel rightwardly of the information transducer 22 for transporting a card carried by the carriage in a card reading path past the information transducer. A drive screw 28 disposed parallel to the carriage guides 26 engages a nut 30 carried by the carriage 24. The drive screw 28, bidirectionally rotatably driven by a motor 29, reciprocates the carriage between its limits of travel. Stationary sleeve bearings 32 and 34 mount the drive screw 38 at its opposite end to facilitate bidirectional rotation of the drive screw about its axis while limiting axial translation thereof. Bering 32 is mounted in a cross-member 35 which spans frame side walls 37 and 39, while bearing 34 is mounted in rear frame wall 41 which also spans side walls 37 and 39.

The motor 29 is bidirectional, and depending upon its mode of energization, drives the screw 28 in one direction or the other to either advance the carriage in the direction of arrow 31 (FIG. 3) toward its first limit of travel (FIG. 2) proximate the baffle 20 or away from its first limit of travel in a direction opposite to arrow 31, i.e., toward its second limit of travel proximate information transducer 22. As the carriage 24 is driven from its first limit of travel shown in FIG. 2 to its second limit of travel beyond the information transducer 22, a card carried by the carriage moves in a path past the information transducer where information thereon can be read.

The construction of the carriage 24 and the drive means 28, 29 therefor may be in accordance with the principles disclosed in copending U.S. patent application Ser. No. 724,697, filed Sept. 17, 1976, Kistner et al., assigned to the assignee of the present application. The entire disclosure of copending application Ser. No. 724,697 is expressly incorporated herein by reference.

To position the baffle 20 between its lower blocking position (FIGS. 1 and 3) and its upper unblocking position (FIG. 2), the carriage is provided with an actuating element, preferably a cam 38, and the baffle 20 is provided with a cooperating cam follower surface 40. The cam follower surface 40, in a preferred form of the invention, constitutes the lower surface of the end of an angulated member 42 which is formed integral with the planar baffle 20.

As the carriage 24 is reciprocated leftwardly toward its first limit of travel by the motor-driven screw 28, the cam 38 strikes the cam follower surface 40. Continued leftward movement of the carriage 24 causes the cam follower surface 40 to slide upwardly relative to the leftwardly moving cam 38, to a point where the horizontal surface 44 of angulated member 42 rests on a horizontal surface 45 of the baffle-actuating cam element 38. Movement of the cam follower surface 40 upwardly relative to the cam 38 raises the baffle 20, positioning its lower edge 20a above the card guide slot 14b, as shown in FIG. 2.

With the card guide slot 14b unblocked, a partially inserted card 12 in the card guide slot 14 can be advanced rightwardly by the person inserting the card to a point where it enters the nip of a pair of superimposed card transport rollers 46, 46 mounted for rotation about spaced parallel horizontal axes. Once the leading edge of an inserted card has entered the nip of rollers 46, 46 the card is positively driven onto the carriage 24 for transport rightwardly past the information transducer 22 when the carriage is reciprocated by rotation of the motor-driven screw 28.

With the baffle 20 cammed to its unblocking position (FIG. 2) and an inserted card transferred by rollers 46, 46 onto the carriage 24, initial rightward movement of the carriage 24 by motorized screw 28 causes disengagement of the cam surface 40 and the cam 38, placing the baffle in its blocking position. The baffle 20 remains in its blocking position while the carriage 24 is transporting the card past the information transducer 22 to the second limit position of the carriage proximate the information transducer.

Following the card reading operation by information transducer 22, the motor 29 drives screw 28 to transport the carriage 24 leftwardly toward its first limit of travel (FIG. 2) proximate baffle 20. As the carriage approaches its first limit of travel the cam 38 engages the cam follower surface 40 raising the baffle 20 to its unblocking position with its lower edge 20a above the card slot 14 b. Simultaneously, the card transport rollers 46, 46 are rotated to transfer the card from the carriage 24 past the baffle into the card slot 14b to a point where its left hand edge extends leftwardly of the housing slot 10b whereat it can be removed by the user. As is apparent, the direction of rotation of the card transport rollers 46, 46 is reversible depending upon whether a card is being transferred from the card guide slot 14b to the carriage 24 or vice versa.

The motor 29, which reciprocates the card carriage 24 between its first and second limits of travel, can be controlled in a variety of ways. For example, the sensor 18 communicating with a partially inserted card in card guide slot 14b may be used to control the motor. The sensor 18 may be responsive to specific information encoded on the partially inserted card 12, or to the mere fact that information is in fact encoded on the card. Upon sensing by sensor 18 either the specific information or the fact that information is encoded on the card, an appropriate control signal is generated. The signal energizes the motor 29 in the direction such that the carriage 24 is reciprocated to its leftmost, or first, limit position (FIG. 2) during the course of which the cam 38 associated with the carriage engages the cam surface 40 associated with the baffle to raise the baffle to its unblocking position whereupon by suitable circuit control means (not shown) the card transport rollers 46, 46 are rotated in a direction to transport the card into the card carriage after it has been inserted past the baffle by operating personnel.

Once on the card carriage, the direction of rotation of the drive screw 28 is reversed and the carriage 24 with the card thereon is driven to its other, or second, limit of travel to transport the card along a path where it can be read by the information transducer 22. After the card has been read, the direction of the motor 29 is again reversed to drive the carriage 24 leftwardly to its leftmost limit position. As the carriage 24 approaches its leftmost limit position, the baffle is cammed upwardly to its unblocking position and the transport rollers 46, 46 energized in a direction to transfer the card from the carriage past the baffle 20 through the card guide slot 14b to a point where it projects from the housing insertion slot 10b to facilitate removal by operating personnel.

What is claimed is:

1. A reader for a card having information recorded thereon, comprising:
   a protective housing having a card insertion slot in a wall thereof,
   a relatively stationary information transducer located within said housing,
   a card carriage for supporting said card for movement in a path past said transducer to read information therefrom,
   a carriage guide mounting said card carriage for movement between first and second points between which said path is located, said first and second travel points being proximate said baffle and transducer, respectively,
   a baffle mounted for movement between a blocking position and unblocking position, said baffle configured to prevent insertion of said card beyond said baffle when in said blocking position and to permit insertion of said card beyond said baffle when in said unblocking position, said baffle normally being positioned in said blocking position,
   an actuating element mounted on said carriage for movement therewith, and
   means mounted to said baffle, which is physically engageable with said actuating element when said carriage is proximate said baffle, for directly imparting movement to said baffle to move it from its blocking position to its unblocking position when said carriage is proximate said baffle and moving toward its first limit of travel, said actuating element facilitating movement of said baffle from its unblocking position to its blocking position when said carriage moves away from its first limit of travel.

2. The reader of claim 1 wherein said actuating element is a cam mounted to said carriage and said baffle-mounted means is a cam follower surface associated with said baffle, said cam slidingly engaging said cam follower surface when said carriage is proximate said baffle and moving toward and away from its first limit of travel to move said baffle between its unblocking and blocking positions, respectively.

3. The reader of claim 2 wherein said carriage guide mounts said carriage for movement along said path in a direction generally colinear to the direction in which said card is inserted to facilitate without changing the direction of card movement, transfer of an inserted card between said slot and carriage as said carriage moves toward said first limit of travel and said cam moves said baffle to its unblocking position.

* * * * *